No. 782,377.

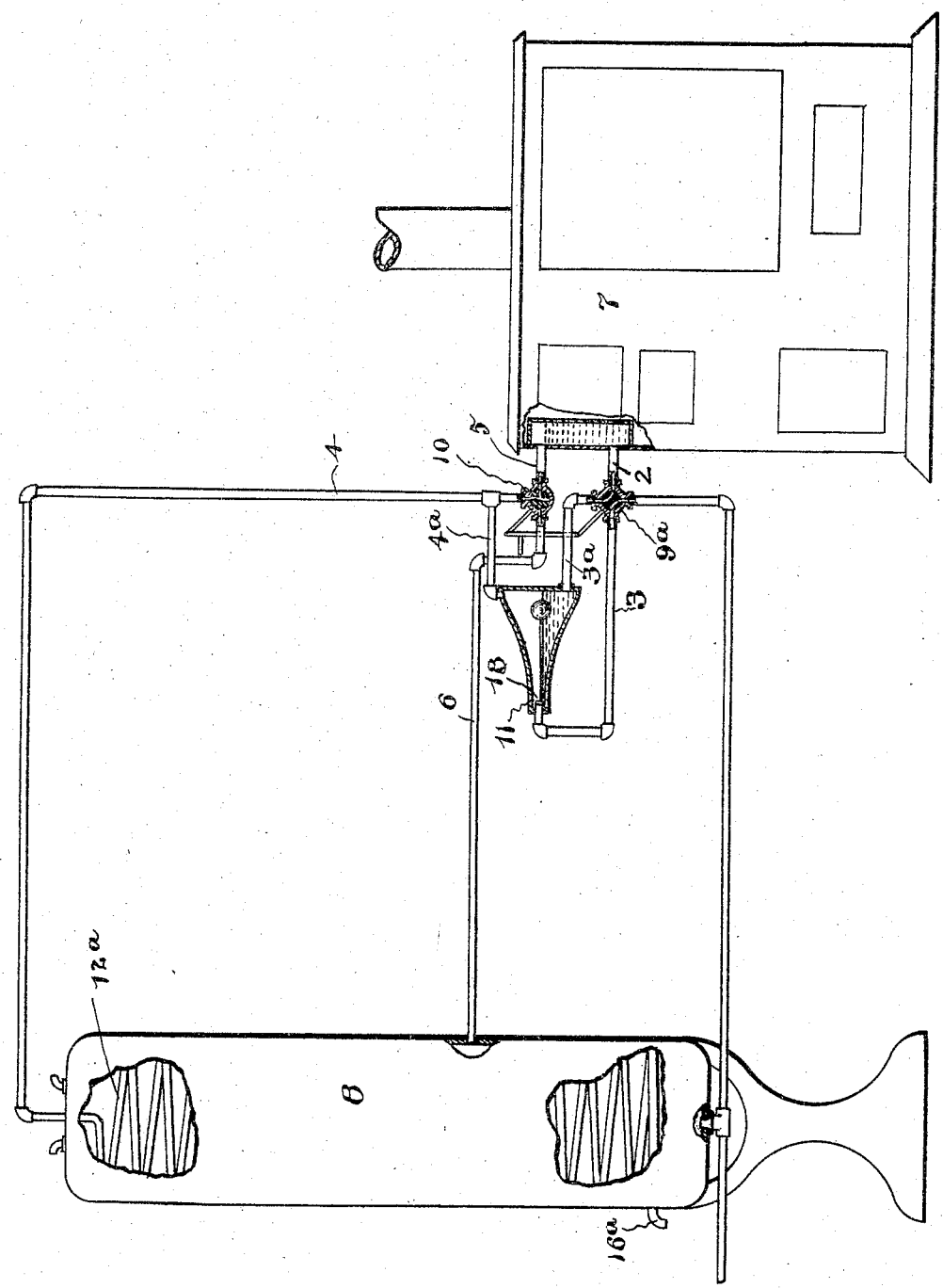

Patented February 14, 1905.

UNITED STATES PATENT OFFICE.

LOUIS E. BEERS, OF ASPEN, COLORADO.

DISTILLING APPARATUS.

SPECIFICATION forming part of Letters Patent No. 782,377, dated February 14, 1905.

Application filed December 23, 1903. Serial No. 186,376.

*To all whom it may concern:*

Be it known that I, LOUIS E. BEERS, a citizen of the United States, residing at Aspen, in the county of Pitkin and State of Colorado, have invented new and useful Improvements in Distilling Apparatus, of which the following is a specification.

This invention relates particularly to a distilling apparatus well adapted for domestic use, although not confined thereto. The embodiment herein shown illustrates the invention in connection with a domestic hot-water heating apparatus; and the particular object of the invention is to combine the distilling apparatus with the ordinary hot-water apparatus, whereby either may be used for the respective purpose thereof.

A further object of the invention is to provide a construction which shall be safe in operation, so that danger of accident due to low water will be avoided; also, the steam generated is condensed in a coil in the hot-water tank, so that the condensation acts to heat the water in the tank.

The accompanying drawing is a view, partly in elevation and partly in section, of the apparatus with the valves in the position occupied when the apparatus is used as a still.

Referring specifically to the drawing, 7 indicates a range of any desired or suitable construction, having a water-back or heater connected to an ordinary hot-water tank 8. To heat the water in said tank, a circulation is effected through the cold-water-supply pipe 1, four-way valve $9^a$, and pipe 2 to the water-back and thence through pipe 5, three-way valve 10, and circulation-pipe 6 to the hot-water tank 8.

The pipe 1 leads into a pipe 2, leading, as stated, to the heater 7 and into separate pipes 3 and $3^a$, which lead separately to a cold-water tank or vessel 11, which is water and steam tight and in which the pipe 3 has a float-valve at 18. The four-way valve $9^a$ is at the junction of the pipes 2, 3, and $3^a$ and is so constructed that the pipes 1 and 2 and 3 and $3^a$ may be connected with each other, or, in the other position, the pipes 1 and 3 and $3^a$ and 2, the former being the position when the apparatus is used to heat water for the ordinary tank and the latter being the position when the apparatus is used as a still, as shown in the drawing.

At the valve 10 the pipe 5 is connected to the steam-pipe 4, which leads to the condensing-coil $12^a$, located within the hot-water tank 8 and the coil ends in an open outlet at $16^a$. The pipe 4 has a branch $4^a$ leading therefrom into the top of the cold-water tank 11 to equalize the pressure on the water in the tank with that in the water-back when steam is on to prevent backing up of the water. In using the apparatus as a hot-water heater the water flows through the pipe 1, four-way valve $9^a$, and pipe 2 to the water-back and thence through the pipes 5 and 6 to the tank 8.

To operate the still in connection with the hot-water heater, the valves $9^a$ and 10 are shifted, as shown in the drawing, so that the flow of water is through pipes 1 and 3 to the tank 11 and pipes $3^a$ and 2 to the water-back, whence the steam flows through pipes 5 and 4 to the condensing-coil.

The cold-water tank 11 and the float-valve therein are so positioned that the water-level maintained in the tank by the valve is slightly below the connection of the pipe 5 with the water-back of the range. Consequently when the still connection is opened a space is allowed in the upper part of the water-back for the generation of steam, and this level is maintained by the float-valve, which prevents the inlet of water to the tank 11, and consequently to the water-back, to which it is connected, except when the water falls below the predetermined level, and the steam-pressure entering above the water-level in the tank through the branch pipe $4^a$ equalizes the pressure, so that the water cannot back out of the water-back into the tank. As the water sinks in the water-back the float-valve admits an additional supply. The steam is condensed in the coil $12^a$ and the distilled water is received from the end $16^a$. The act of condensation heats the water in the tank 8, whereby the double result is produced of distilling the water and also heating the water in said tank. The valve connections are such that there is no chance for accident, such as might occur if separate valves were used at the inlet and the outlet to the water-back. By the use of a four-way valve at the inlet and three-way valve at the outlet the various connections are assured.

When the heater is connected to the hot-water tank for the ordinary hot-water system, the water back or heater is full of water at all times; but the tank 11 is cut off from the water-supply and the water-level in said tank is necessarily lower than that in the water-back, because while the water-back is full the water-level in said tank 11 is that which remains at the cessation of the previous distilling action. If then the distilling connections be opened, the immediate result will be that the water-back will be connected by the pipes 2 and 3ª with the tank 11, and consequently the water in the said water-back and tank will come to the same level, thereby lowering the level in the heater to form a steam-space at the top thereof.

What I claim as new, and desire to secure by Letters Patent, is—

1. The combination with a water-heater, and a hot-water tank, of supply and circulation pipes connected thereto, a closed cold-water tank connected to the supply-pipe and to the heater and located to have the same water-level as the heater, a valve in the supply-pipe controlling the flow therefrom directly to the heater or indirectly through the cold-water tank to the heater, a condensing-coil in the hot-water tank, and a steam-pipe connecting the circulation-pipe and the condensing-coil and having a branch extending into the cold-water tank above the water-level therein.

2. A combined water heating and distilling apparatus comprising a heater, a hot-water tank, supply and circulation pipes connecting the heater and tank, a condensing-coil in the said tank, a steam-pipe connecting the heater and coil, valves in said pipes constructed to disconnect the hot-water tank, and connect the coil or vice versa, with the heater, and means to lower the water-level in the heater, and automatically control the water-supply thereto according to the height of water therein, when the coil is connected.

3. The combination with a water-heater, of a hot-water tank, and a condenser, each having pipes connecting the same with the heater, valves in the pipes constructed to open the connection between the heater and either the tank or the condenser, and means to lower the water-level in the heater when the connection with the condenser is opened.

In testimony whereof I have signed my name to this specification in the presence of two subscribing witnesses.

LOUIS E. BEERS.

Witnesses:
   THOS. FLYNN, Jr.,
   T. J. FLYNN.